June 28, 1955 C. JUNGBLUT 2,711,913
FLEXIBLE PIPE JOINT WITH SCREW-THREADED SLEEVE
Filed March 27, 1950

Inventor:
Charles Jungblut
by: J. Delattre-Seguy
Attorney

United States Patent Office 2,711,913
Patented June 28, 1955

2,711,913

FLEXIBLE PIPE JOINT WITH SCREW-THREADED SLEEVE

Charles Jungblut, Nancy, France, assignor to Compagnie de Pont-à-Mousson, Nancy, France, a French body corporate Application March 27, 1950, Serial No. 152,095

Claims priority, application France March 30, 1949

2 Claims. (Cl. 285—163)

The present invention relates to fluid-tight joints for pipes and like interfitting members.

Joints for interfitting pipes respectively provided with a spigot and a bell end are known in which fluidtightness is obtained by compressing a resilient washer or ring, for example a rubber washer, in a cavity provided between the spigot and the inner wall of the bell by means of a circular rim or flange tightened by means of bolts or by screwing or by any other means. Such joints offer the advantage of increasing the flexibility of the coupling and permit slight angular deflections of one pipe relatively to the other without impairing the tightness of the joint; but they require various ancillary members.

Joints for interfitting pipes are also known in which the coupling is effected by screwing a screw-threaded spigot into a tapped bell, fluid-tightness being obtained by means of a fluid-tight product or of a special screw-thread. These latter joints enable to avoid the use of ancillary joint members, but have the drawback of being rigid and of preventing any relative deflection of the consecutive elements of the piping.

The invention has for its object an improved bell-and-spigot joint for interfitting tubular elements and particularly pipes of small diameter which are adapted to convey a fluid of any nature even at high pressure (15 kg/cm² and higher), said joint combining the advantages which are common to flexibile joints and screws joints, i. e. the possibility of effecting slight angular deflections of the consecutive pipe elements without the use of ancillary members.

The invention has for its object a bell and spigot joint wherein one of the two oppositely located coaxial surfaces respectively provided in the bell of one of the tubular elements and on the spigot of the next piping element, which is engaged in said bell, is provided with a screw-thread, the major diameter of which is such that between the threads and the other of said surfaces a continuous annular space is left in which is housed a thin resilient sleeve, which is slightly compressed radially, said screw-thread being screwed in said sleeve and the other of said surfaces being provided with abutting means for locking the sleeve relatively thereto.

In addition to the above mentioned advantages, the penetration of said screw-thread into said sleeve and the aforesaid locking means prevent any dislocation when pressure fluid is flowing through the piping formed.

The invention also has for its object piping elements provided with spigot and bell ends which are machined in accordance with the features of the foregoing joint.

In the accompanying drawing, which is given solely by way of example:

Figure 1:
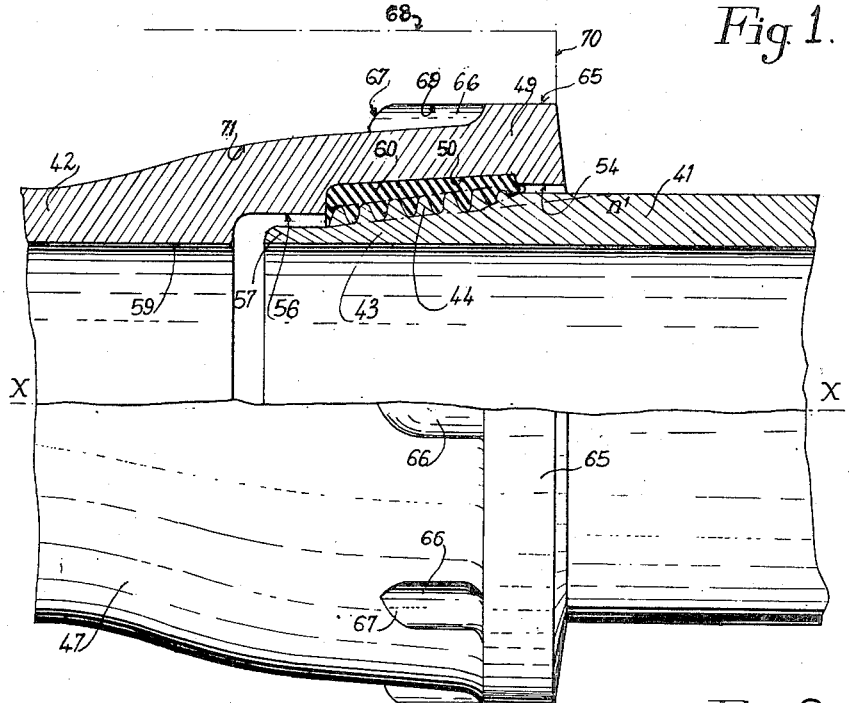
Fig. 1 is a longitudinal half-section and a half-elevation on a full-size scale or on a substantially larger scale showing the ends of two piping elements united according to the invention.

According to the embodiment shown, the invention is applied to the coupling between two pipes 41 and 42 of comparatively small diameter, for example smaller than ten centimetres.

The pipe 41 terminates in a spigot 43 which on the outside comprises an external conical screwing thread 44 with preferably rounded threads and thread bottoms. The thread tops are arranged on a frusto-conical surface 45 the top of which is located beyond the end of element 41 on the longitudinal axis XX of the joint. The slope of the generating lines 45 of this frusto-conical surface with respect to axis XX is, for example, of the order of 6%. On the major part of the threaded portion and from the end of the spigot 43 the ends of the grooves which separate the threads are located on another frusto-conical surface the generating lines 46 of which are parallel with the generating lines 45, both corresponding frusto-conical surfaces having the same slope.

On the remainder of the threaded portion from $m$ to $n$ (Fig. 2) the bottoms of the grooves which separate the threads are located on a frusto-conical surface the generating lines 47 of which have with respect to axis XX a slope which is much larger than that of the generating lines 45 and 46; the slope of said generating lines 47 is, for example, of the order of 35%. Owing to the larger slope of the generating line $mn$, the external thread terminates at $n$ on the outer cylindrical surface 48 of pipe 41 whereas it would extend much farther till $n^1$ (Fig. 1) if the bottom of the grooves remained located, on the whole length of the threaded surface, on the frusto-conical surface having the generating-line 46.

Of course, the threaded portion 44 may comprise one or more threads.

The other pipe 42 is provided with a bell 49. Said bell comprises a rectangular groove 50 limited by two abutments 51 and 52 normal to axis XX, the abutment 52 which is located on the entrance side being preferably connected through a throat 53 with the cylindrical entrance surface 54 the diameter of which is larger than that of the outer cylindrical surface 48 of pipe 41.

The axial distance $l$ which separates the abutments 51 and 52 is at least substantially equal to that of the axial length of thread 44 of the spigot 43.

The bottom of the annular groove 50 is smooth and frusto-conical and its generating lines 55 are very substantially parallel with the generating lines 45 and 46 of thread 44.

Following shoulder 51 the bell comprises a cylindrical part 56 intended to serve as recess receiving end 57 of spigot 43 with a certain radial play. Cylindrical part 56 is connected through a throat 58 with the internal cylindrical surface 59 of the current part of pipe 42.

Located in groove 50 of bell 49 is a sleeve 60 of rubber or other resilient material slightly compressed radially between the bottom of said groove and thread 44, the threads of which enter said sleeve substantially up to the bottom.

Figure 3:
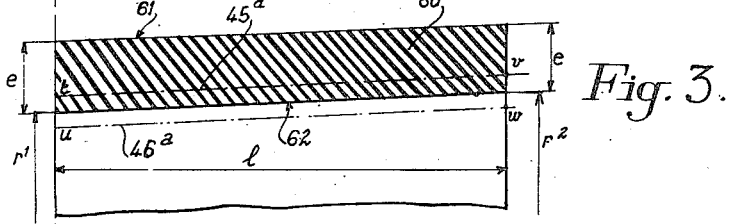
Fig. 3 is a radial axial sectional view showing in its free state, before mounting, the resilient sleeve of the joint shown in Figs. 1 and 2.

Said sleeve has, for example, in the free condition, the radial longitudinal section shown in full lines in Fig. 3. It has a frusto-conical shape and a constant radial thickness $ë$; moreover, its axial length is at least fairly equal to length $l$ of groove 50. The outer surface 61 is frusto-conical and has the same slope and the same end radii as the bottom of said groove 50. As to its inner surface 62 it is also frusto-conical and has the same slope so that its generating lines are parallel with the generating lines 45 and 46 of the thread but its end radii $r^1$ and $r^2$ are intermediary between the radii of points $t$, $u$, $v$, $w$ located plumb with said ends on the generating lines 45 and 46 which when carried over on the section of Fig.

3 occupy in this latter the positions shown in dotted lines at 45a and 46a.

It results therefrom that the sleeve 60 which may enter the groove 50 without any difficulty fills the grooves between the threads in the threaded part of the spigot 41, the possible excess of resilient material forming slight beads 63 and 64 at the ends of the sleeve and more particularly towards the outside of the bell.

Figure 2:
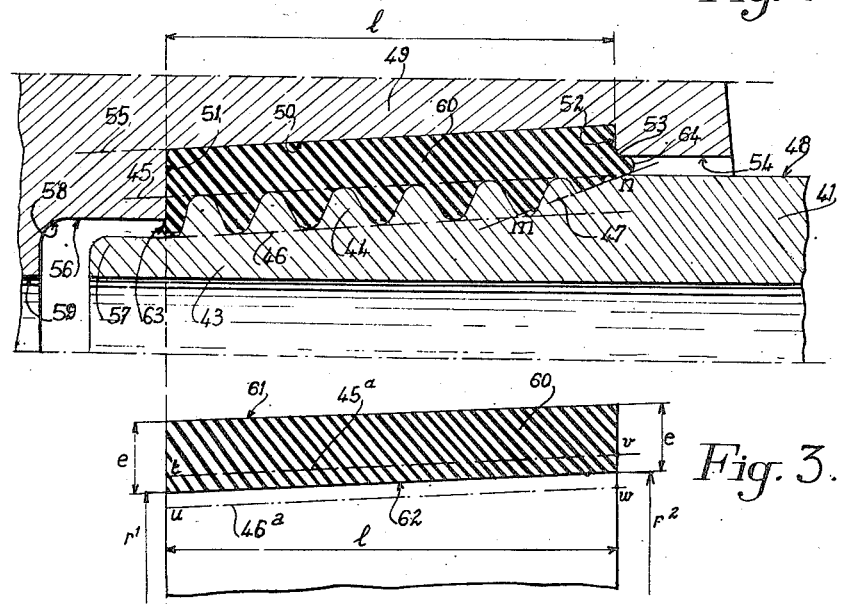
Fig. 2 is a radial longitudinal sectional view on a larger scale showing the closed joint.

Outwardly the bell 49 is provided with an end fillet 65 to which a certain number of longitudinal ribs 66 (Fig. 1) are connected which are integral with the pipe. Said ribs which are intended to make it possible readily to hold fast pipe 42 during the assembly preferably have a cylindrical shape with an end 67 in the shape of a portion of an ogive or spherical calotte. Said ribs do not hinder, therefore, the axial disassembly of pipe 42 when the latter is centrifugally cast in a rotary mould as shown in dotted lines at 68 (Fig. 1). The cavities 69 of said mould which are intended to form said ribs 66 may be obtained very easily through holes provided axially in the mould from its end face 70 before the machining of recess 71 for the bell, the machining of this latter insuring ipso facto the transformation of said holes into said cavities.

The assembly of the elements of the joint offers no difficulty. The sleeve 60 which is in the free condition shown in Fig. 3 enters the groove 50 in the bell 49 of the pipe 42 and this in a dry state in order to increase the coefficient of friction between said sleeve and the bottom of the groove 50 and thus to prevent the rotation of said sleeve in said groove when the spigot 43 is screwed. The bell 49 is then held fast by means of a wrench inserted between ribs 66 which avoids the necessity to bear upon the smooth outer surface of the bell, scratch it and remove the tar, bitumen or other layer which covers it.

The spigot 43 of the pipe 41 is then screwed into the sleeve 60 after having, preferably, lubricated its inner surface and/or the surface of the thread with water, for example, in order to reduce friction and facilitate the screwing operation.

It is to be noted that since the slopes of the inner surface of the sleeve 60 and of the outer and inner surfaces 45 and 46 respectively of the threads are the same all the threads 44 enter the sleeve 60 during the screwing operation in a progressive manner and in equal amounts; thus, the radial compression of said sleeve is uniform in all points of its length.

At the end of the screwing operation the rubber fills the whole empty space between the threads and the sleeve. There exists now only the possibility, for the same, to form beads at 63 and 64 and the tightening stress then increases in very large proportions.

Said increase of the tightening stress indicates the end of the tightening, which end, moreover, corresponds to the moment when the 35% frusto-conical part came into contact with the sleeve 60 since the total length of the screwed part of the spigot is equal to that of the groove 50 of the bell. It may also be noted that since the outer diameter of the thread is larger than that of the cylindrical part 56 of the bell, the end of the screwing operation is indicated anyhow by the impossibility to drive this operation farther when the first thread comes into contact with the abutment 51. But it is to be noted that this metallic contact is not desirable because of the resulting electric continuity.

It will be noted, moreover, that the absence of any thread in the bell 49 facilitates the machining operations on said bell and makes it possible, furthermore, to manufacture pipe connections which may be moulded without any difficulty with a simple core without requiring a later machining.

It is also to be noted that the slope of 6% which is adopted, preferably, for the generating lines of the frusto-conical surfaces 45, 46 and 55 makes it possible to screw the spigot into French current threaded connections as well as into the American conical connections.

Of course the invention is in no way restricted to the embodiment illustrated and described which has only been chosen by way of example.

According to a modification not shown, the slopes of the truncation cones of the threads of the bell and of the spigot may be different.

On the other hand, the sleeve may be made of a resilient material other than rubber. Thus it is possible to use synthetic resins or any other substance which becomes resilient by vulcanization and which, on the other hand, has special properties that enable the sleeve to withstand the action of steam, gasoline, hydrocarbons, and the like.

Having now described my invention what I claim as new and desire to secure by Letters Patent is:

1. In a screwed bell-and-spigot joint for removably connecting two pipe-elements having a diameter not in excess of ten centimeters and being subjected to high internal pressure, in combination: a bell section forming an integral extension of one of said pipe-elements and having an annular and continuous wall, the inner surface of said wall comprising an inner groove; said groove having an elongated longitudinal radial cross-section and comprising a bottom frusto-conical surface of revolution around the longitudinal axis of said bell section, a large base located towards the inlet to the said bell, and two transverse end faces; a male element engaging said bell section; said male element having a surface coaxial with and opposite said groove, and forming with said groove a continuous annular space; said male element comprising a forward end cylindrical portion, and rearward of said forward end portion, said coaxial surface, and rearward of said coaxial surface, a frusto-conical tightening section; said coaxial surface comprising a threaded portion, substantially frusto-conical and parallel to the said bottom surface of said groove, and the threads of which have a constant depth; the slope of said tightening section being substantially greater than the slope of said threaded portion with respect to the axis of said male element; in said annular space, a single unitary resilient impermeable thin locking sleeve, having a continuous annular transverse section and integral and external smooth surfaces, said internal and external surfaces being parallel, the external surface of said sleeve in its free state having exactly the dimensions and the conicity of said bottom surface of said groove; the longitudinal radial section of said sleeve in its free state being substantially rectangular and having a constant thickness such that, when said male element is screwed within said bell, said sleeve is slightly compressed between said male element and said bell section, whereby said sleeve fills completely said annular space and said threaded portion; said forward end cylindrical portion of said male element protruding beyond said sleeve into said bell section; said tightening portion abutting against an annular portion of the inner surface of said sleeve near the mouth of said bell section, whereby said sleeve is compressed and a tight contact is obtained between said sleeve and said male element.

2. A screwed bell-and-spigot joint as claimed in claim 1, in which the continuous annular transverse section of said sleeve in its free state has a longitudinal dimension at least five times the dimension of the radial thickness of said sleeve, and in which the longitudinal radial section of said sleeve in its free state is greater by about 5 per cent than the corresponding section of said annular space.

References Cited in the file of this patent

UNITED STATES PATENTS

| | | |
|---|---|---|
| 360,172 | Reese | Mar. 29, 1887 |
| 566,136 | Caldwell | Aug. 18, 1896 |
| 993,661 | Dudley | May 30, 1911 |
| 1,324,046 | Hatfeld | Dec. 9, 1919 |

(Other references on following page)

UNITED STATES PATENTS

| | | |
|---|---|---|
| 1,386,518 | Loomis | Aug. 2, 1921 |
| 1,756,167 | Avery | Apr. 29, 1930 |
| 1,824,492 | Morris | Sept. 22, 1931 |
| 1,985,325 | Nathan | Dec. 25, 1934 |
| 2,032,576 | Hering | Mar. 3, 1936 |
| 2,210,833 | Clough | Aug. 6, 1940 |
| 2,271,936 | Carson | Feb. 3, 1942 |
| 2,399,791 | Conroy | May 7, 1946 |
| 2,459,005 | Shearman | Jan. 11, 1949 |
| 2,517,778 | Fischer | Aug. 8, 1950 |

FOREIGN PATENTS

| | | |
|---|---|---|
| 26,681 | England | Dec. 31, 1901 |
| 768,040 | France | July 30, 1934 |
| 821,365 | France | Dec. 3, 1937 |
| 883,566 | France | Mar. 29, 1943 |
| 28,399 | Norway | Nov. 12, 1917 |

OTHER REFERENCES

Ser. No. 293,149, Boissou (A. P. C.), published May 25, 1943.